Oct. 23, 1962
A. H. BEAL
3,059,342
WELL SURVEY INSTRUMENTS
Filed Dec. 18, 1959
4 Sheets-Sheet 1
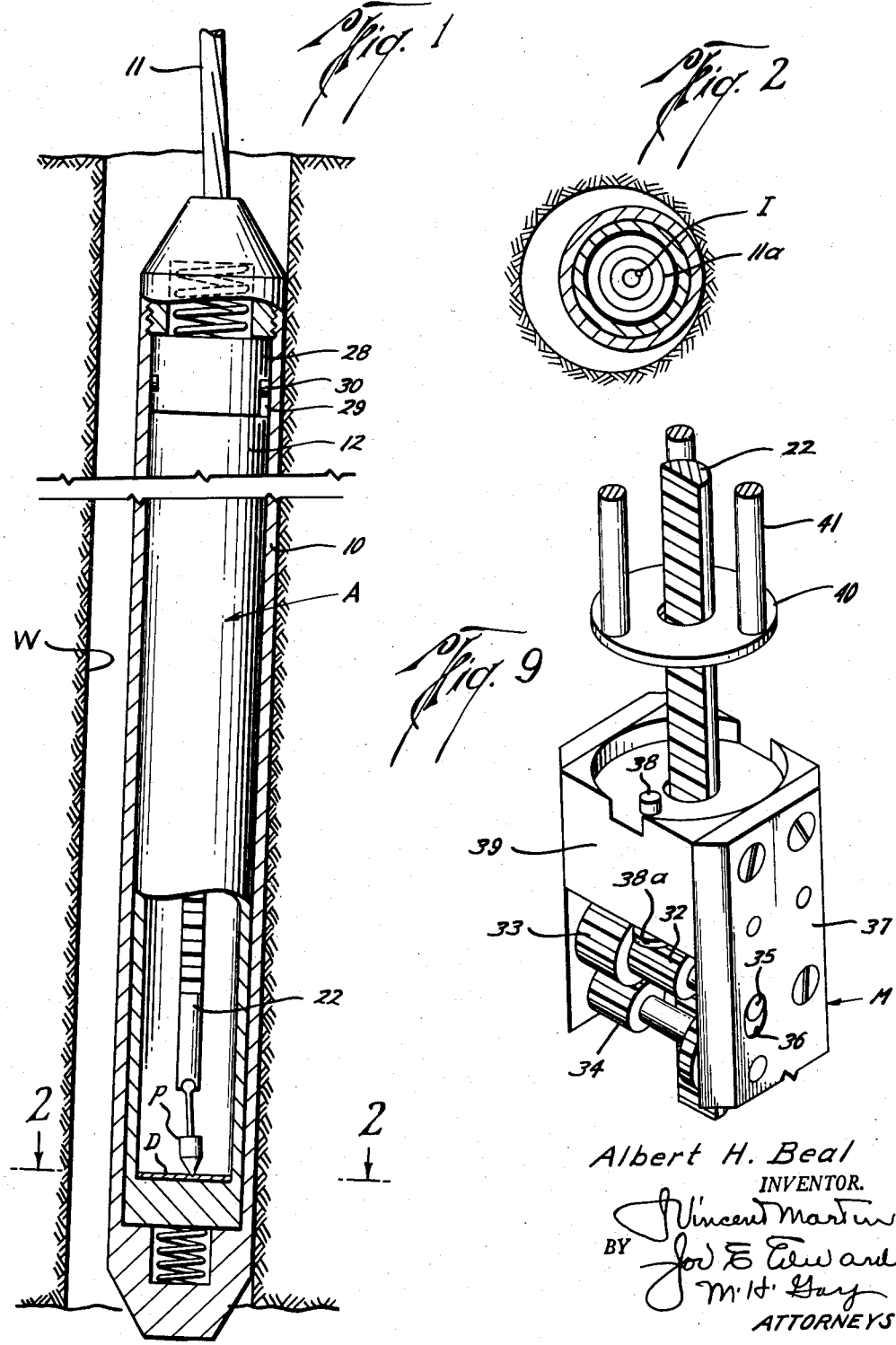
Albert H. Beal
INVENTOR.
BY Vincent Martin
Jos. E. Edwards
M. H. Gay
ATTORNEYS

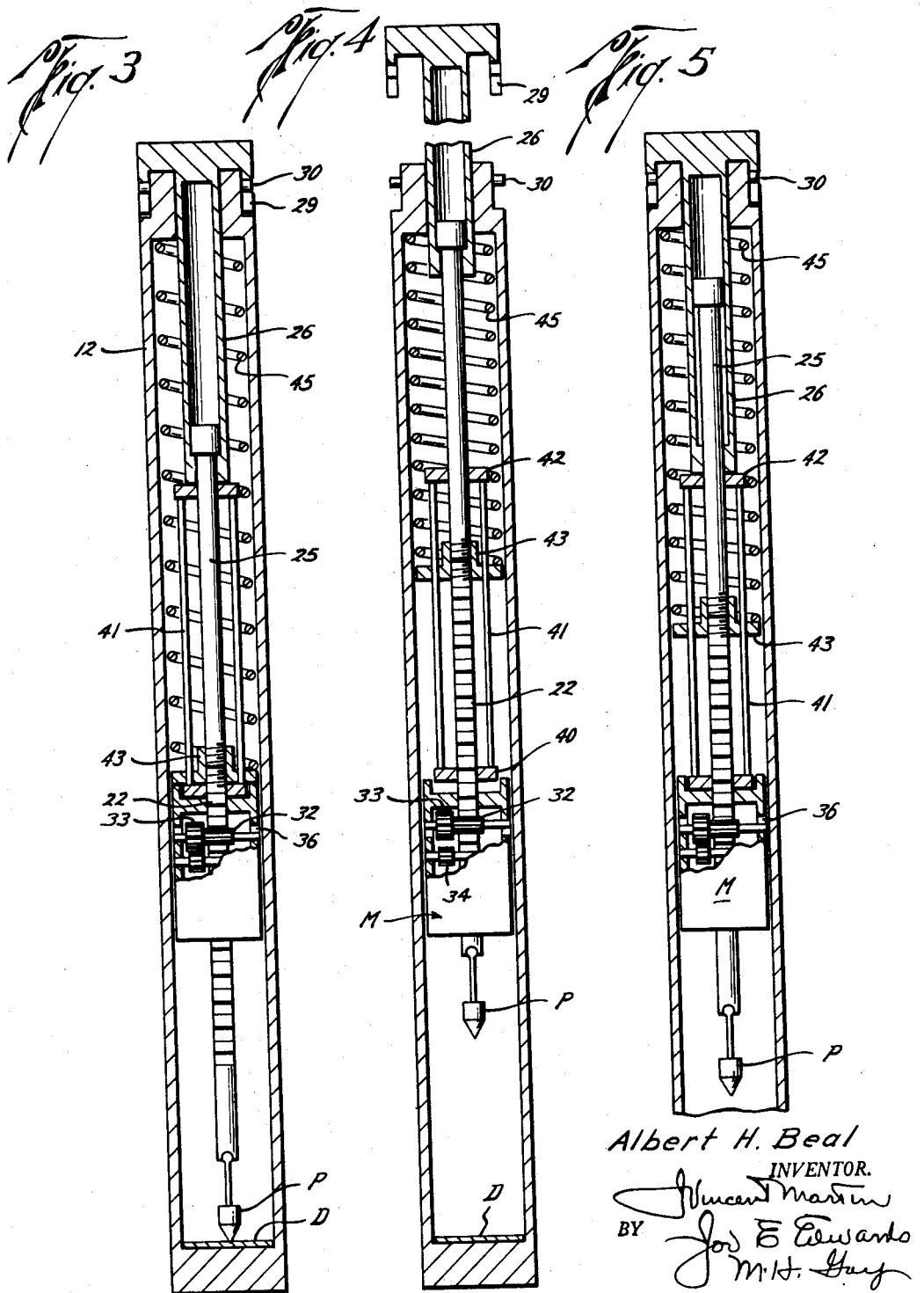

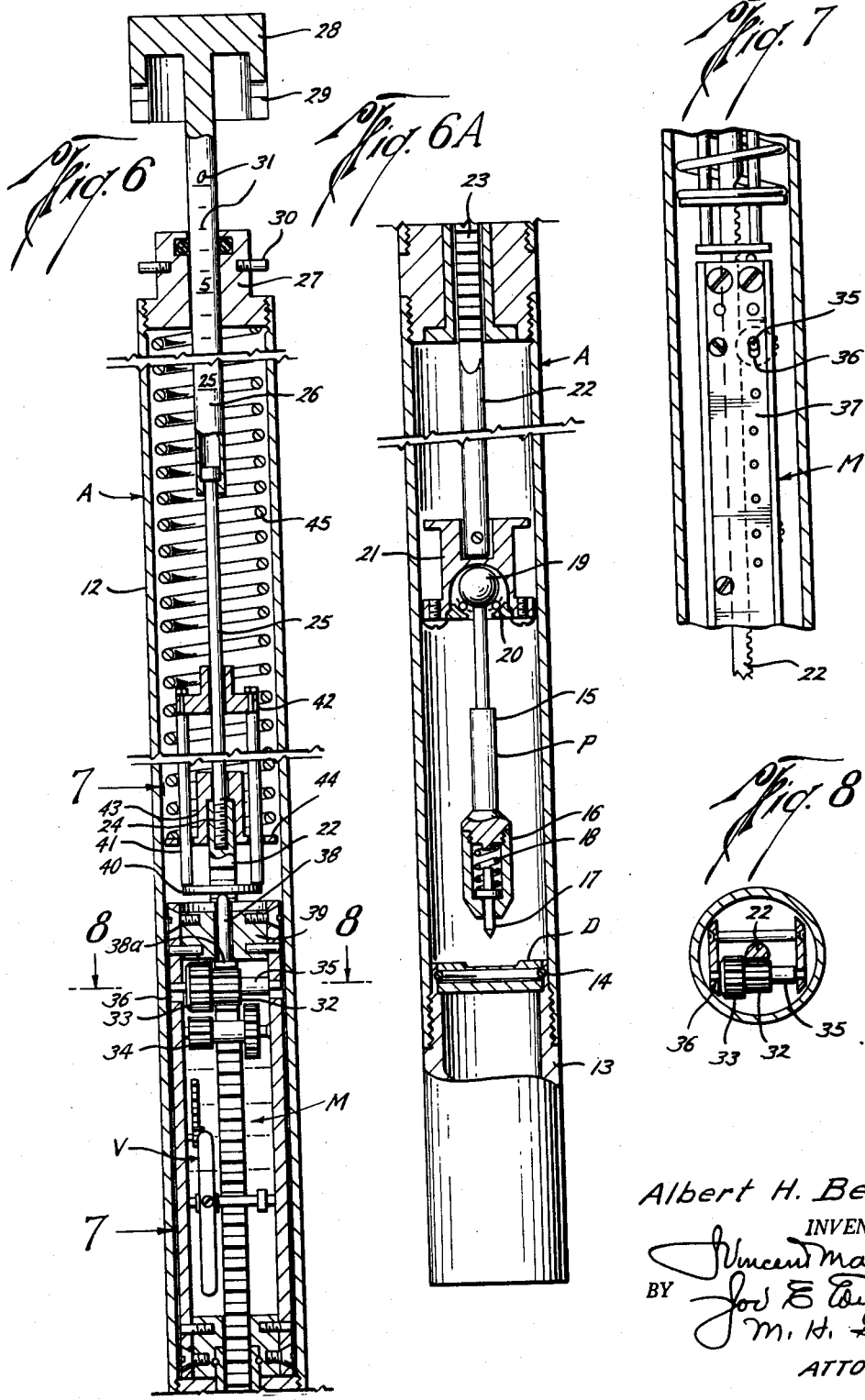

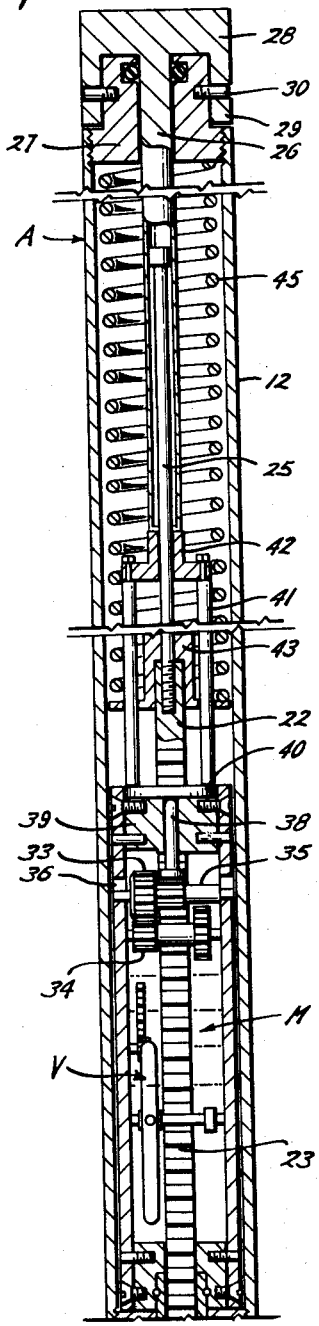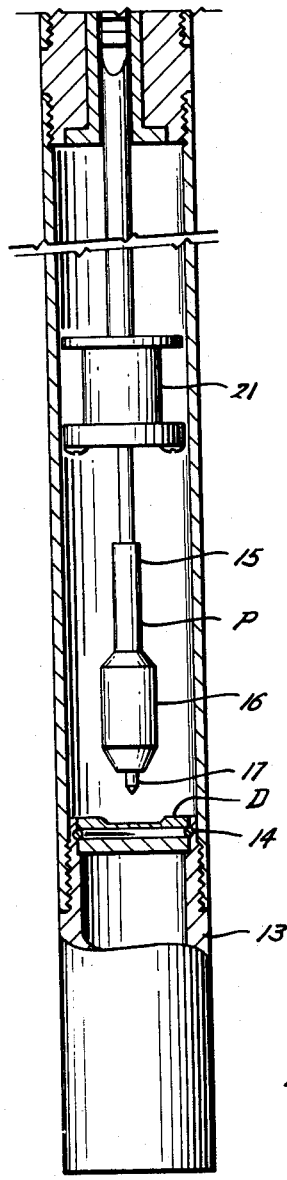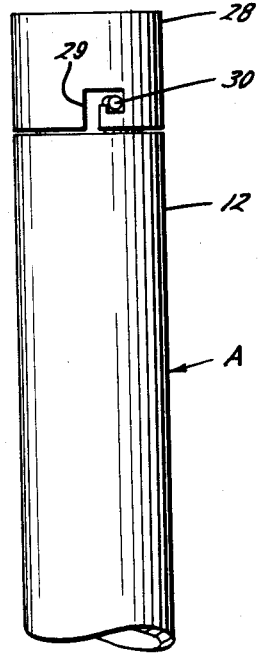

United States Patent Office 3,059,342
Patented Oct. 23, 1962

3,059,342
WELL SURVEY INSTRUMENTS
Albert H. Beal, Box 18061, 1927 Edmunson,
Houston, Tex.
Filed Dec. 18, 1959, Ser. No. 860,396
8 Claims. (Cl. 33—205.5)

This invention relates to new and useful improvements in well survey instruments.

The invention is an improvement on the structure disclosed in my prior Patent No. 2,405,937 and relates particularly to an improved setting assembly for the timing mechanism of the survey instrument.

One object of the invention is to provide an improved well survey instrument which is constructed so that once set, the timing period will remain fixed and cannot be affected or changed by reason of undue jar or impact such as may result from dropping or lowering the instrument within the well bore, whereby accuracy of instrument operation is assured.

An important object is to provide an improved setting assembly for the timing mechanism of a well survey instrument, which setting assembly is interconnected with said timing mechanism in such manner that the actuating element of the instrument is automatically disengaged from the timing mechanism when said element is operated to set the timing period and is automatically re-engaged with said mechanism after the setting operation is complete; the arrangement obviating the necessity of moving the gear trains of the timing mechanism in a reverse direction during said setting operation.

Another object is to provide an improved setting assembly for the timing mechanism of a well survey instrument which assembly includes a setting plunger having axial outward movement relative to the survey instrument housing for the purpose of setting the timing period; said plunger having a telescoping connection therein which allows said plunger to be retracted into the instrument housing after the setting operation is complete whereby the disadvantage of having the plunger in an outwardly projecting position throughout the timing period is eliminated.

Still another object is to provide a well survey instrument for indicating deviation from the vertical of a well bore and having an improved suspension means for the plumb bob marking element of said instrument.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is a view, partly in section and partly in elevation, illustrating a well survey instrument, constructed in accordance with the invention disposed within an inclined well bore;

FIGURE 2 is a horizontal cross-sectional view taken on the line 2—2 of FIGURE 1;

FIGURE 3 is a view, partly in section and partly in elevation, of the improved well survey instrument and illustrating the parts of said instrument in a position just prior to the time that the timing mechanism of said instrument is to be set;

FIGURE 4 is a similar view illustrating the setting plunger moved upwardly in order to effect a setting of the timing mechanism;

FIGURE 5 is a similar view showing the timing mechanism set for a predetermined time interval and illustrating the upper portion of the setting plunger returned into a retracted position within the instrument;

FIGURE 6 is a transverse vertical sectional view of the upper portion of the well survey instrument and showing the details of construction of the timing mechanism and the improved setting assembly;

FIGURE 6a is a continuation of FIGURE 6 illustrating the lower portion of the instrument;

FIGURE 7 is a longitudinal sectional view taken on the line 7—7 of FIGURE 6;

FIGURE 8 is a horizontal cross-sectional view taken on the line 8—8 of FIGURE 6;

FIGURE 9 is an isometric view illustrating the upper portion of the timing mechanism and showing a portion of the gear rack on the setting plunger;

FIGURE 10 is a view similar to FIGURE 6 of the upper portion of the instrument but showing the plunger in retracted position within the instrument after the timing mechanism has been set;

FIGURE 10a is a continuation of FIGURE 10 illustrating the lower portion of the instrument, and FIGURE 11 is an elevation of the upper portion of the instrument showing a releasable connection for maintaining the setting plunger in its retracted position.

In the drawings the letter A generally indicates a well survey instrument which is adapted to indicate and record the inclination of a well bore from the vertical axis. The instrument A is mounted within an outer casing 10 which may have its upper end suitably secured to a lowering cable 11 whereby the instrument A may be lowered into position within the well bore W. The instrument A includes a record member or indicator disk D and a plumb bob type marking element P which overhangs said disk. As will be explained, the plumb bob P is adapted to be moved downwardly into engagement with the upper surface of the indicating disk D; since the plumb bob hangs vertically at all times, it will be evident that when the instrument is disposed within an inclined well bore as shown in FIGURE 1, the plumb bob moves off center of disk D. When it is moved into contact with the disk, a mark or indication I (FIGURE 2) will be made on the upper surface of disk D. The disk may be formed with concentric degree circles 11a which are representative of degrees of inclination. By determining the distance between the position of the mark or indication I and the center of the disk D, the degree of inclination of the well bore W is indicated and recorded. As will be explained, the plumb bob P is normally spaced above the disk and its downward movement is controlled by a timing mechanism which moves said plumb bob downwardly into contact with the disk. The timing period is set so as to permit the instrument to be lowered to proper position within the well bore after which the instrument is permitted to come to rest until such time as the plumb bob engages the disk and makes the recording.

Referring to FIGURES 6 and 6a wherein the details of construction of the instrument are shown, the instrument includes an outer tubular housing or case 12 which is of substantial length. The lower end of the housing (FIGURE 6a) is closed by a closure member or cap 13 which is threaded into the lower end of the housing. The disk D upon which the indication I is made may be supported by means of a snap ring 14 in the upper end of the closure member 13; with this arrangement, the removal of the closure member permits removal of disk D, whereby after one disk has been marked, another disk may be readily substituted and returned to the instrument for the next operation.

Suspended above the disk D is the plumb bob P and said plumb bob includes a shank 15 having a tubular sleeve 16 secured to its lower end. A marking pin 17 is slidable within the sleeve 16 and is urged outwardly by a coil spring 18. The lower end of the marking pin 17 is sharpened or pointed and projects from the lower end of the sleeve 16. The shank 15 of the plumb bob extends upwardly and has a suspending ball 19 secured thereto. This ball is mounted on bearings 20 which are suitably supported within a carrier block 21. The plumb bob is thus mounted for universal movement within the housing or case and will always hang in a vertical plane.

The supporting block 21 from which the plumb bob P is suspended is carried by the lower end of an elongate actuating or gear rack bar 22. The bar is formed with the gear rack teeth 23 and said bar extends upwardly beyond the timing mechanism generally indicated at M, said mechanism being disposed within the housing at a point above the plumb bob. The upper end of the gear rack bar 22 is connected by threads 24 to a setting rod 25 and this rod has its enlarged upper end in telescoping engagement with the bore of a tubular setting plunger 26. The plunger 26 extends upwardly through the upper end of the instrument, projecting through a closure collar 27 which is threaded into the top of the housing or case 12. The upper end of the setting plunger 26 has a flanged head member 28 and when the plunger 26 is lowered with respect to the instrument housing, as shown in FIGURE 10, J-slots 29 in the head 28 are engageable with radially projecting pins 30 formed in the closure collar 27. The inter-engagement of the pins and J-slots will releasably latch the setting plunger 26 in a retracted or lowered position within the housing; in such position, the plunger has moved downwardly relative to the upper end of the setting rod 25 which is secured to the actuating bar. One side of the setting plunger 26 may be formed with suitable indicia such as numerals and graduations 31, which are representative of the time intervals.

With the setting plunger 26 having telescoping connection with the enlarged upper end of the rod 25, which rod is secured to the upper end of the gear rack bar 22, an upward or outward pull on the setting plunger will result in lifting the setting rod 25 and the actuating bar 22 whereby the plumb bob P is raised with respect to the indicator disk D. As will be explained, the amount of outward movement of the setting plunger will determine the setting of the timing period and will control the length of time that it will take to move the plumb bob P downwardly into marking engagement with the indicator disk D.

The timing mechanism M is of usual construction and includes the usual gear trains which have been omitted from FIGURES 6 and 10 for the sake of clarity. The timing mechanism includes the usual verge escapement generally indicated at V, such escapement controlling the speed of rotation of the various gear trains of the timing mechanism, said gear trains controlling the speed of rotation of a driving gear 32 of a gear and pinion unit which is in engagement with the gear teeth 23 of the gear rack on the actuating bar. As will be explained, the gear rack bar is moved upwardly a predetermined distance and is then engaged with the driving gear 32. Driving gear 32 will thereafter control the downward movement of the actuating bar to thereby control the interval or period of time that is required for the plumb bob P to move downwardly into engagement with the indicating disk. Thus, by varying the upward movement of the actuating bar 22 during the setting operation, the timing period of the instrument may be controlled.

Since the driving gear 32, which is controlled in its rotation by the timing mechanism M, is in engagement with the gear teeth 23 of the actuating bar, an upward movement of the bar during the setting operation would normally require that all of the gear trains of the timing mechanism be actuated in a reverse direction. In order to prevent this and for the purpose of disconnecting the driving gear 32 from the gear trains of the timing mechanism M during the setting operation, the gear unit includes both the driving gear 32 and a pinion 33. This pinion is adapted to engage the final driven gear 34 of the timing mechanism. It is preferable that the driving gear 32 and pinion 33 be made integral and said gear and pinion are mounted upon a transverse shaft 35. The ends of the shaft 35 are disposed and confined within vertical slots 36 (FIGURE 7) which are provided in side plates 37 of the timing mechanism M. Thus, the driving gear 32 and its pinion may undergo a vertical or longitudinal movement within the housing with respect to the timing mechanism. When the pinion 33 and gear 32 are in a raised position with respect to the slots 36, as shown in FIGURE 6 (which is during the setting operation), the pinion 33 is disengaged from the gear 34 of the timing mechanism. Thus, at this time, upward movement of the actuating bar 22 may rotate both the driving gear 32 and pinion 33 in a reverse direction without in any manner affecting the gear trains of the timing mechanism M.

With the driving gear and its pinion 33 having a limited movement within the supporting slots 36, the upward movement of the actuating bar 22 will automatically lift the gear and pinion to the position of FIGURE 6. So long as the actuating bar continues to move upwardly, which is during the setting operation, the pinion 33 remains disengaged from the timing mechanism M. After the timing period has been set by the predetermined upward movement of the actuating bar 22, it is desirable to return the driving gear 32 and its pinion 33 to a lowered position with respect to the supporting slots 36 in the manner shown in FIGURE 10 so that the pinion 33 is re-engaged with gear 34 of the timing mechanism. Thereafter, the timing mechanism controls downward motion of the gear rack and thereby controls the timing period which will be required for the plumb bob P to move into marking engagement with the disk D.

In order to assure that the driving gear and its pinion are re-engaged with the gear trains of the timing mechanism M, a vertically movable plunger 38 is provided to move within the axial opening of a closure block 39 which is secured between the upper ends of the side plates 37 of the timing mechanism. The plunger 38 has an enlarged head 38a at its lower end and such head engages the gear 32, spanning the teeth thereof and being capable of applying a downward movement to the gear 32 and its attached pinion 33. The upper end of the plunger 38 projects upwardly above the block 39 and is adapted to be engaged by a cross bar 40 secured to a pair of diametrically opposed rods 41. A cross head 42, through which the setting rod 25 extends, is connected to the upper end of rods 41. The cross head and rod assembly having the lower plate 40 is adapted to engage and rest upon the upper end of plunger 38 after the timing mechanism has been set so as to assure that gear 32 and its pinion will move downwardly to be re-engaged with the timing mechanism.

For powering the device to urge the gear rack bar 22 downwardly, with its rate of movement being controlled by the verge escapement of the timing mechanism M, the upper end of the gear rack bar has a tubular sleeve 43 engaged with its end in surrounding relationship to setting rod 25. The sleeve has a lower lateral flange 44 provided with suitable openings through which the rod 41 of the cross head assembly projects and this flange has the lower end of a power spring 45 engaged therewith. The upper end of the power spring 45 is confined beneath the closure cap 27 which closes the upper end of the housing or case 12 of the instrument. The spring 45 constantly exerts its pressure downwardly on the flanged sleeve 43 and through this sleeve on the upper end of the gear rack bar 22 whereby the spring is constantly forcing the gear rack bar in a downward direction. With the gear rack teeth 23 in engagement with the drive gear 32 and with the drive gear rotation controlled by the timing mechanism through the verge escapement, the downward motion of the gear rack is controlled and its rate of movement is determined by the particular setting when the gear rack bar was first moved upwardly by means of the setting rod 25 and its telescoping setting plunger 26.

The manner of setting and the operation of the apparatus is illustrated schematically in FIGURES 3, 4 and 5. In FIGURE 3 the instrument has just completed one cycle of operation and the plumb bob P has moved downwardly into engagement with the indicating disk D. To accomplish a resetting of the instrument for its next operation, the lower closure 13 is first removed and a new unmarked disk D is positioned. Thereafter, the setting plunger 26 is released from connection with the upper end of the instrument housing 12 by a slight rotation which disengages the connecting pins 30 and J-slot 29. The plunger 26 is then pulled upwardly and through its engagement with the setting rod 25, the gear rack bar 22 is also moved upwardly. Upon initial upward movement of the gear rack bar 22, the teeth of the gear rack having engagement with the teeth of the driving gear 32 result in moving the driving gear upwardly as limited by the length of the slots 36 in which the driving gear shaft 35 is disposed. Such upward movement of the driving gear 32 results in a simultaneous upward movement of the connecting pinion 33 and the parts move to the position shown in FIGURE 4. In such position the pinion 33 is disengaged from the gear 34 of the timing mechanism M. Therefore, during the resetting operation the gear rack and its driving gear are, in effect, disconnected from the gear trains of the timing mechanism M and it is not necessary that the various gears in said timing mechanism rotate in a reverse direction. The amount of upward movement of the setting plunger is in accordance with the time period which is desired and the setting is facilitated by providing the indicia 31 on said plunger, such indicia representing the time period in minutes. During the setting operation, an additional compression is placed on the power spring 45.

After the setting operation is complete, the plumb bob P has been moved a predetermined distance above the indicator disk D and it is now desirable to re-engage the pinion 33 with the gear 34 of the timing mechanism M. This is automatically accomplished as soon as upward movement of the setting plunger 26 and setting rod 25 is stopped because the power spring 45 acting through the flanged sleeve member 43 applies a downward force to the gear rack bar 22. With the teeth 23 of said bar in engagement with the gear 32, the downward force on bar 22 results in moving the gear 32 and its pinion 33 downwardly into engagement with the timing mechanism. Thereafter, the timing mechanism controls the rate of motion of the gear rack bar 22 and thereby controls the rate of movement of the plumb bob P toward the indicator disk D.

After setting of the timing period is complete, it is desirable to return or retract the setting plunger downwardly into the instrument housing so that it will not project therefrom and it is for this purpose that the telescoping connection between the plunger 26 and the setting rod 25 is provided. As the plunger 26 is moved inwardly of the housing, it merely telescopes the setting rod in the manner shown in FIGURE 5 and does not in any way affect the previous time period setting. As the setting plunger is moved inwardly of the housing, its lower or inner end engages the cross head 42 which is secured through the rods 41 to the plate 40. The parts are so proportioned that when the setting plunger 26 has moved to its final inward position and is latched to the instrument housing through the J-slot and pin connections, its lower end engages the cross head. In turn, the plate 40, which is secured to the rods 41, is in contact with the retaining plunger 38. By so contacting the retaining plunger (FIGURE 10), the cross head assembly maintains the enlarged lower end of the plunger in contact with the drive gear 32 and it is impossible for the drive gear to move upwardly so long as these conditions obtain. It is, therefore, obvious that when the setting plunger is returned into position within the housing as shown in FIGURES 5 and 10, such plunger co-acts with the cross head assembly to urge the retaining plunger 38 into a position holding gear 32 and its pinion 33 in engagement with the timing mechanism. With this arrangement, there is no possibility of the drive gear 32 and its pinion 33 moving upwardly out of engagement with the gear train during lowering or dropping of the instrument into the well bore. Thus, the timing mechanism after once being set, is maintained in firm engagement with the drive gear and the drive gear is, in turn, in engagement with the gear rack so that it is assured that the time period setting will not be disturbed.

After the parts have been returned to the position of FIGURES 5 and 10, the timing mechanism M controls the rate of motion of the gear rack bar 22 whereby the rate of movement of the plumb bob P is controlled. The timing period is, of course, set for a sufficient length of time to permit the instrument to reach the desired position within the well bore and to come to rest at such position. When the instrument comes to rest within the well bore, its outer housing 12 will assume the same inclination as the well bore but the plumb bob P will hang in a vertical plane. As the timing period elapses, the pointed lower end of the marking plunger 17 is contacted with the upper surface of the disk D and by reason of the spring mounting of said plunger, the gear rack bar may undergo some movement even after the plunger 17 has marked the disk. Such additional movement will merely drive the pointed end of the marking element 17 tightly into the upper surface of the disk to provide an accurate indication of well bore deviation.

The apparatus is relatively simple in operation and has the advantage of providing a setting plunger which moves axially of the instrument but which after the setting operation is complete may be returned into position within said housing. It is, therefore, not necessary for the plunger to remain in an extended position throughout the timing interval. In addition, the setting plunger is employed to co-act with the cross head assembly and the retaining plunger 38 to assure that once set, the control gear 32 and its pinion 33 will remain in engagement with the timing mechanism M. The particular mounting of the pinion 33 and the drive gear 32 makes it possible to completely disconnect these parts from the timing mechanism during the resetting operation so that a reversal of movement of the various gear trains in the mechanism M is not necessary during a setting operation. The particular mounting of the plumb bob is of some importance since a sensitively mounted plumb bob for accurate indication is desirable. The provision of the spring pressed marking element 17 assures for proper marking of the record disk and eliminates the necessity of extremely fine adjustments with respect to the motion of the gear rack bar. Since the marking element may be depressed within certain limits, the gear rack bar 22 may move a slight distance even after the marking element is in engagement with the disk without placing any undue strain on the timing mechanism.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. A well survey instrument including, a tubular housing, a transversely extending record member within the housing, an elongate actuating bar mounted for axial movement within the housing, a plumb bob element mounted for universal movement on said actuating element and engageable with the record member to mark the same upon movement of the actuating bar and plumb bob element in one direction within the housing, a timing mechanism including gears within the housing, a gear connection between said timing mechanism and the actuating bar whereby the timing mechanism controls the rate of movement of the bar and plumb bob element in the direction moving the plumb bob element toward the record member said gear connection including a gear having interengaging teeth with one of said timing mechanism gears, setting means accessible from the exterior of the instrument housing and connected with the actuating bar for moving said bar and the plumb bob element in a direction away from the record member to thereby set the time period which will be required for said bar and plumb bob element to subsequently move into engagement with the record member, and means for disengaging said inter-engaging teeth for disconnecting the gear connection between the timing mechanism and the actuating bar during the setting operation, whereby said actuating bar is disconnected from the timing mechanism while the setting means is being actuated together with means for reconnecting the gear connection between the timing mechanism and actuating bar upon completion of the setting operation, said means for reconnecting the gear connection being automatically accomplished by movement of the actuating bar in a direction toward the record member, whereby said reconnection occurs at the start of the time period cycle.

2. A well survey instrument including, a tubular housing, a record member within the housing, a plumb bob mounted for universal movement within the housing and movable toward and away from the record member, said plumb bob being engageable with the record member to mark the same upon movement of the plumb bob in one direction within the housing, a gear rack bar movable axially within the housing and having the plumb bob attached thereto whereby movement of the bar will control movement of the plumb bob, a timing mechanism within the housing, a driving gear and pinion unit capable of movement to two positions within the housing, in one position said unit having its driving gear engageable with the gear rack bar and its pinion engageable with the timing mechanism whereby the timing mechanism will control the rate of movement of the bar and its plumb bob in a direction towards the record member, movement of the driving gear and pinion unit to its second position disengaging the pinion from the timing mechanism, whereby the actuating bar and its plumb bob may be moved in a direction away from the record member without having any connection with the timing mechanism, and setting means accessible from the exterior of the instrument housing for moving the actuating bar in a direction away from the housing, the co-action between the gear and the actuating bar automatically moving the driving gear and pinion unit to a position disconnecting the bar from the timing mechanism during the resetting operation and automatically moving the driving gear and pinion unit into a position connecting the bar to the timing mechanism after the setting operation is complete and the bar is moved toward the record member under control of said timing mechanism.

3. A well survey instrument as set forth in claim 2 together with means engageable with the driving gear and pinion unit after said unit has reconnected the actuating bar and timing mechanism to maintain such reconnection throughout the time period required for the actuating bar and its plumb bob to complete the movement which ultimately engages the plumb bob with the record member.

4. A well survey instrument including, a tubular housing, an actuating bar having a toothed gear rack thereon mounted for axial movement within the housing, a marking element suspended from said bar, a record member below the marking element and adapted to be engaged thereby when the bar and marking element are moved downwardly within the housing to their lower limit, a spring means constantly urging the bar downwardly within the housing, a timing mechanism including gears within the housing, gear means interconnecting the actuating bar with the timing mechanism whereby the timing mechanism controls the rate of downward movement of the bar, said gear means including a gear having teeth inter-engaging the teeth of one of said timing mechanism gears, setting means for moving the actuating bar upwardly relative to the record disk, means for disengaging said inter-engaging teeth to disconnect the actuating bar from the timing mechanism while said bar is moving upwardly during the setting operation, and means for re-engaging said inter-engaging teeth at the start of the subsequent downward movement of the actuating bar following the setting operation, whereby the rate of said downward movement of the bar is controlled by the timing mechanism.

5. A well survey instrument as set forth in claim 4, together with retaining means engageable with the gear means after said inter-engaging teeth have been re-engaged for maintaining such re-engagement throughout the downward movement of said bar.

6. A well survey instrument including, a tubular housing, an actuating bar having a toothed gear rack thereon mounted for axial movement in the housing, a plumb bob marking element suspended from the bar, a record member within the housing below said marking element, spring means acting upon the actuating bar to constantly urge the bar and its plumb bob downwardly toward the record member, a timing mechanism within the housing, gear means engageable with the actuating bar and timing mechanism for connecting the same, whereby the timing mechanism controls the rate of movement of the actuating bar and plumb bob marking element in a downward direction, setting means attached to the upper portion of the actuating bar and including an inner setting rod and an outer setting plunger, the latter having its outer end accessible from the exterior of the housing, said rod and plunger having telescoping connection with each other, whereby upward movement of the setting plunger outwardly of the housing imparts upward movement to the rod and actuating bar to adjust said bar to desired position within the housing, the telescoping connection between plunger and rod permitting independent downward movement of said plunger relative to the rod and actuating bar whereby the plunger may be returned to retracted position within the housing after the setting operation has been completed.

7. A well survey instrument as set forth in claim 6, together with means for disengaging the gear means between the actuating bar and timing mechanism when said bar is moving upwardly during the setting operation.

8. A well survey instrument as set forth in claim 6, together with means for disengaging the gear means between the actuating bar and timing mechanism when said bar is moving upwardly during the setting operation, and means operated by the return of the setting plunger to its retracted position within the housing and co-acting with the gear means to assure re-engagement of the gear means to reconnect the actuating bar and the timing mechanism after the setting operation is complete and throughout the subsequent downward movement of said actuating bar.

References Cited in the file of this patent

UNITED STATES PATENTS

| | | |
|---|---|---|
| 628,042 | Schulze | July 4, 1899 |
| 2,405,937 | Beal | Aug. 20, 1946 |
| 2,498,384 | Wikheim | Feb. 21, 1950 |
| 2,557,634 | Cox | June 19, 1951 |